United States Patent [19]

Olson

[11] 4,437,806
[45] Mar. 20, 1984

[54] OVERLOAD MECHANISM FOR THE SYSTEM OF A BOTTOM SILO UNLOADER

[75] Inventor: George E. Olson, Arlington Heights, Ill.

[73] Assignee: A. O. Smith Harvestore Products, Inc., Arlington Heights, Ill.

[21] Appl. No.: 424,414

[22] Filed: Sep. 27, 1982

Related U.S. Application Data

[62] Division of Ser. No. 205,461, Nov. 10, 1980, Pat. No. 4,386,695.

[51] Int. Cl.³ .............................................. B65G 65/46
[52] U.S. Cl. ............................................... 414/307
[58] Field of Search ................................. 414/306-312

[56] References Cited

U.S. PATENT DOCUMENTS 2,635,770 4/1953 Tiedemann .......................... 414/307
3,851,774 12/1974 Laidig et al. ........................ 414/307

Primary Examiner—Robert G. Sheridan
Attorney, Agent, or Firm—Andrus, Sceales, Starke & Sawall

[57] ABSTRACT

An overload mechanism for the drive system of a bottom silo unloader. The silo unloader includes a sweep arm mounted to rotate about the center of the silo and operable to dislodge stored material and convey the dislodged material to a delivery trough formed in the foundation. An overload mechanism is incorporated in the drive system for rotating the sweep arm about the silo, and the overload mechanism includes a drive pawl operably connected to a drive member of the drive system and disposed to be driven in a reciprocating path. A rotatable ratchet having a series of teeth is mounted to be engaged by the drive pawl and engagement of the ratchet teeth by the drive pawl will incrementally rotate the ratchet in one direction. In addition, a holding pawl is engaged with the ratchet teeth to prevent rotation of the ratchet in the opposite direction. The ratchet is mounted on one end of a shaft and a sprocket is connected to the other end of the shaft and is located at the center of the silo. The sprocket in turn is engageable with a turntable, and the inner end of the sweep arm is mounted on the turntable and disposed to rotate with the turntable about the axis of the silo. A resilient member, such as a spring, interconnects the drive pawl and the drive member so that interruption of the rotation of the sweep arm due to engagement of the sweep arm with a densely packed area of stored material will cause compression of said resilient member and enable the drive pawl to move in its reciprocating path without corresponding rotation of the ratchet. This action permits the sweep arm to oscillate and back away from the densely packed area.

4 Claims, 13 Drawing Figures

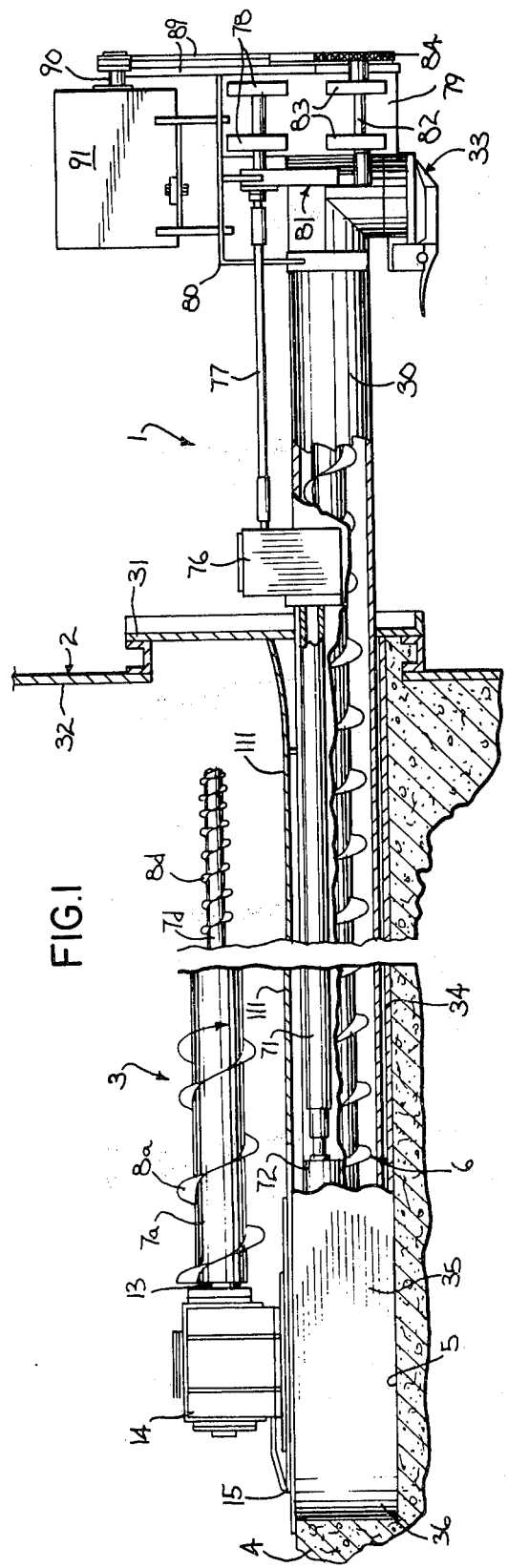
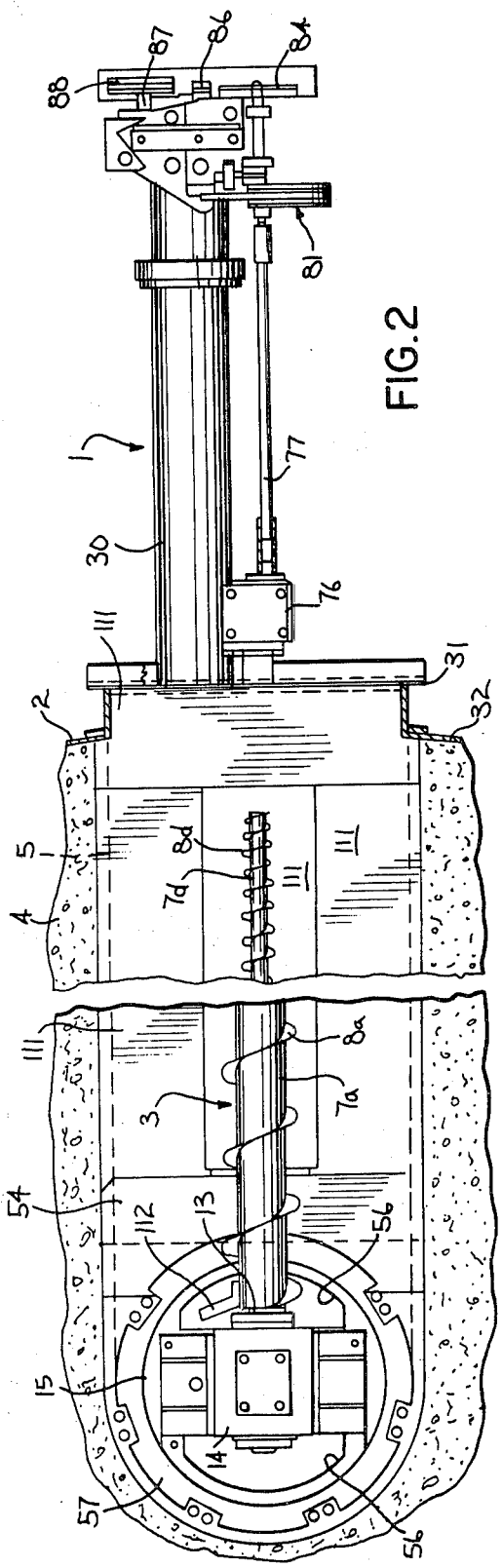
FIG.1
FIG.2

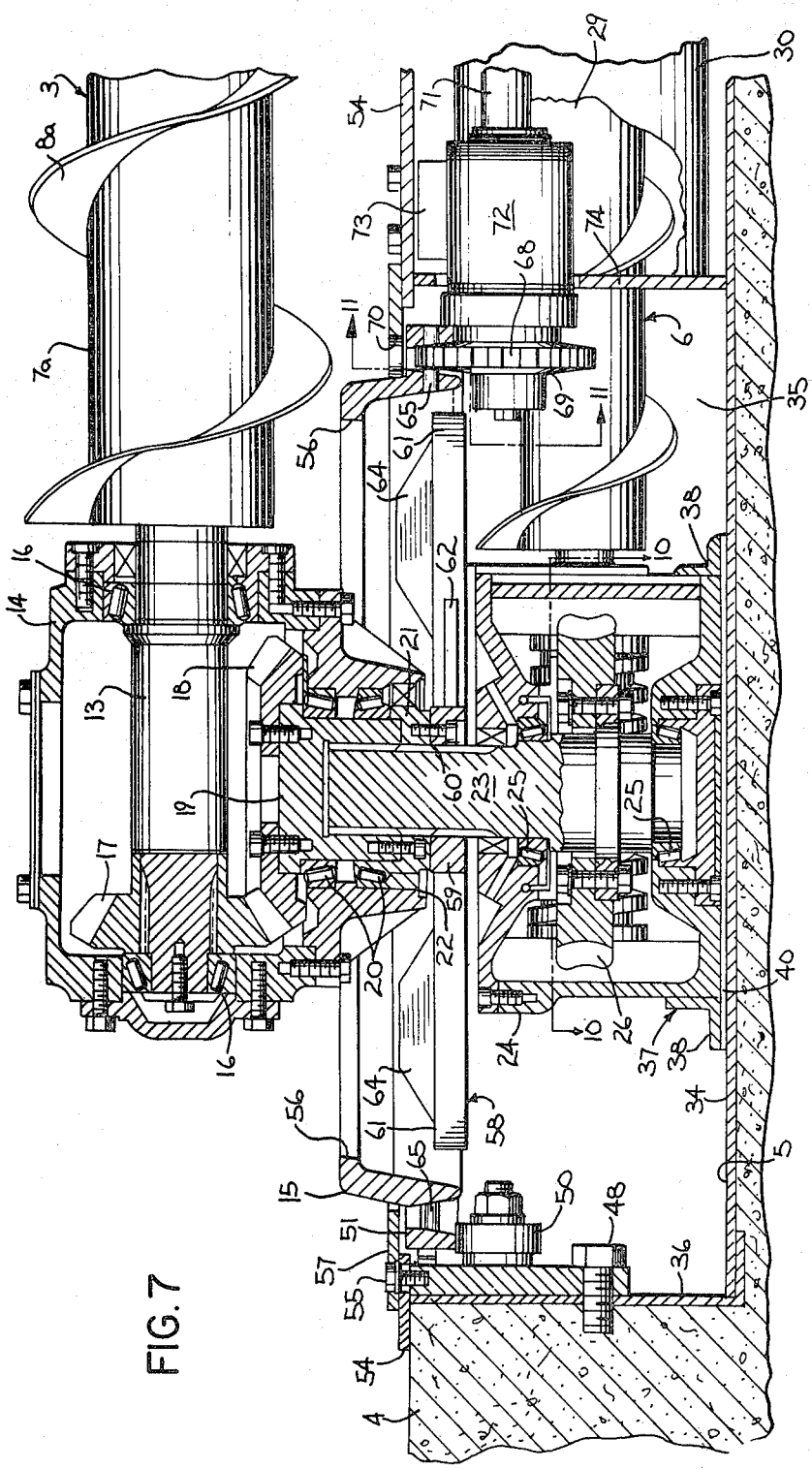

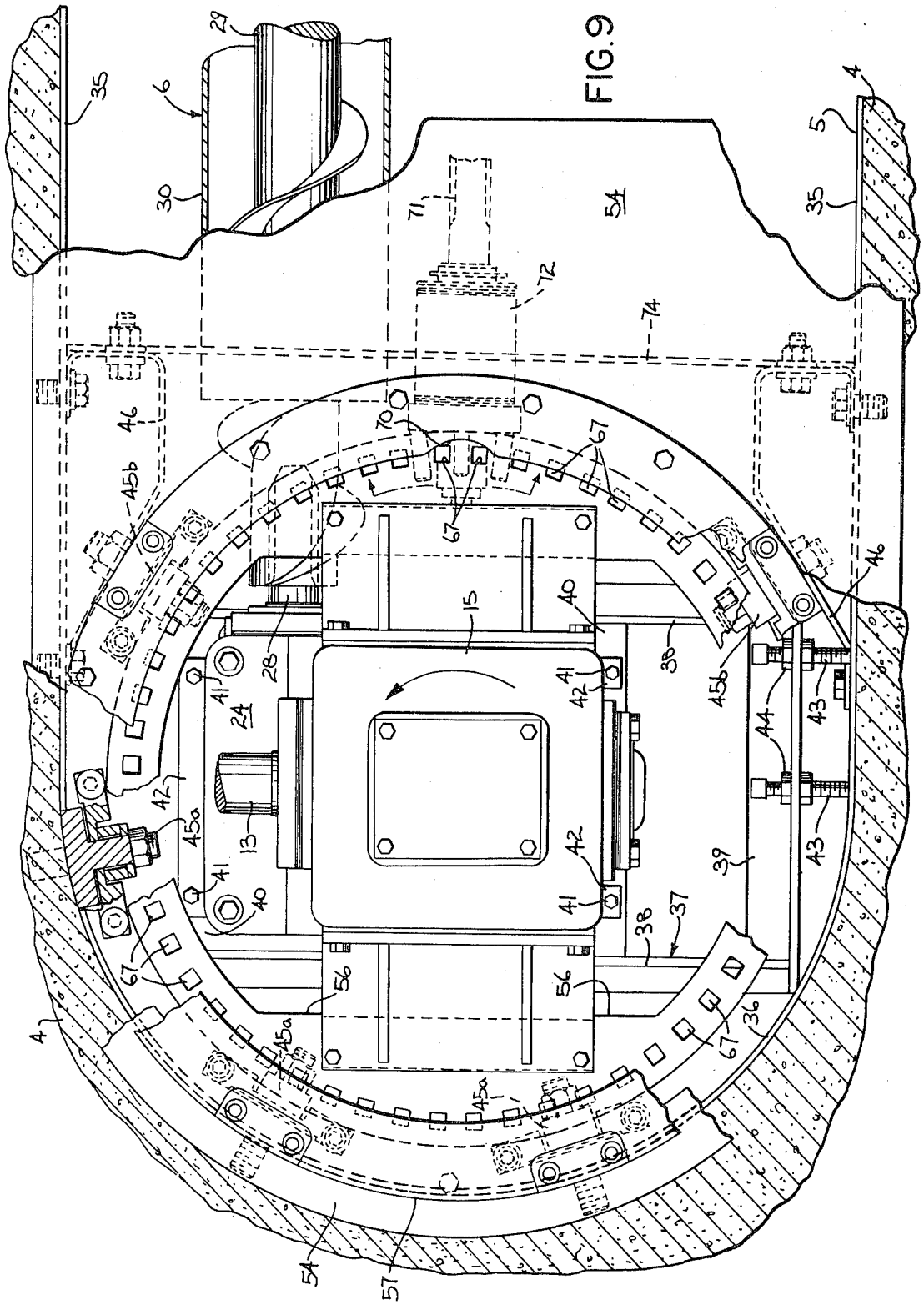

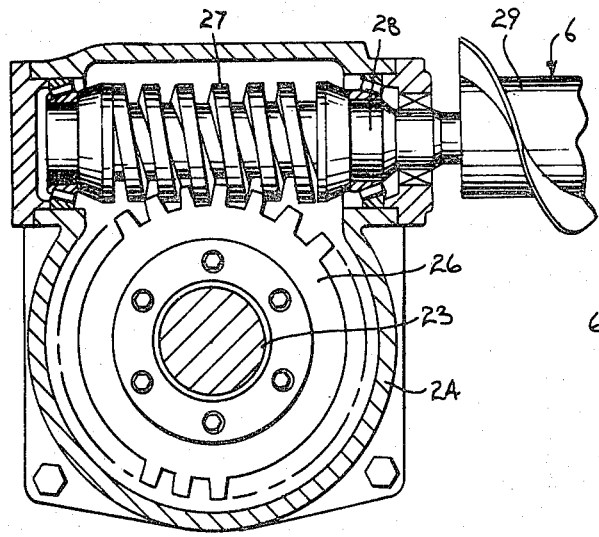
FIG.10
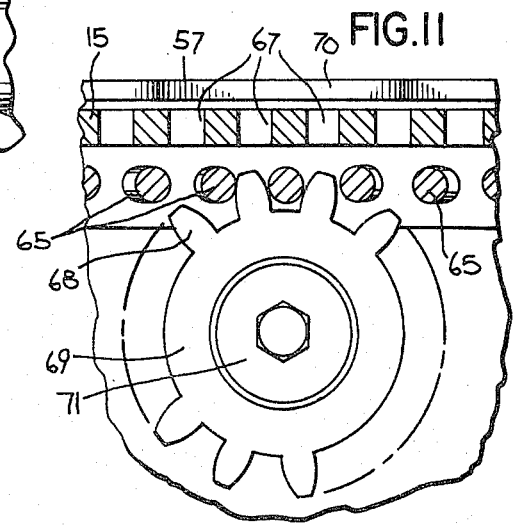
FIG.11
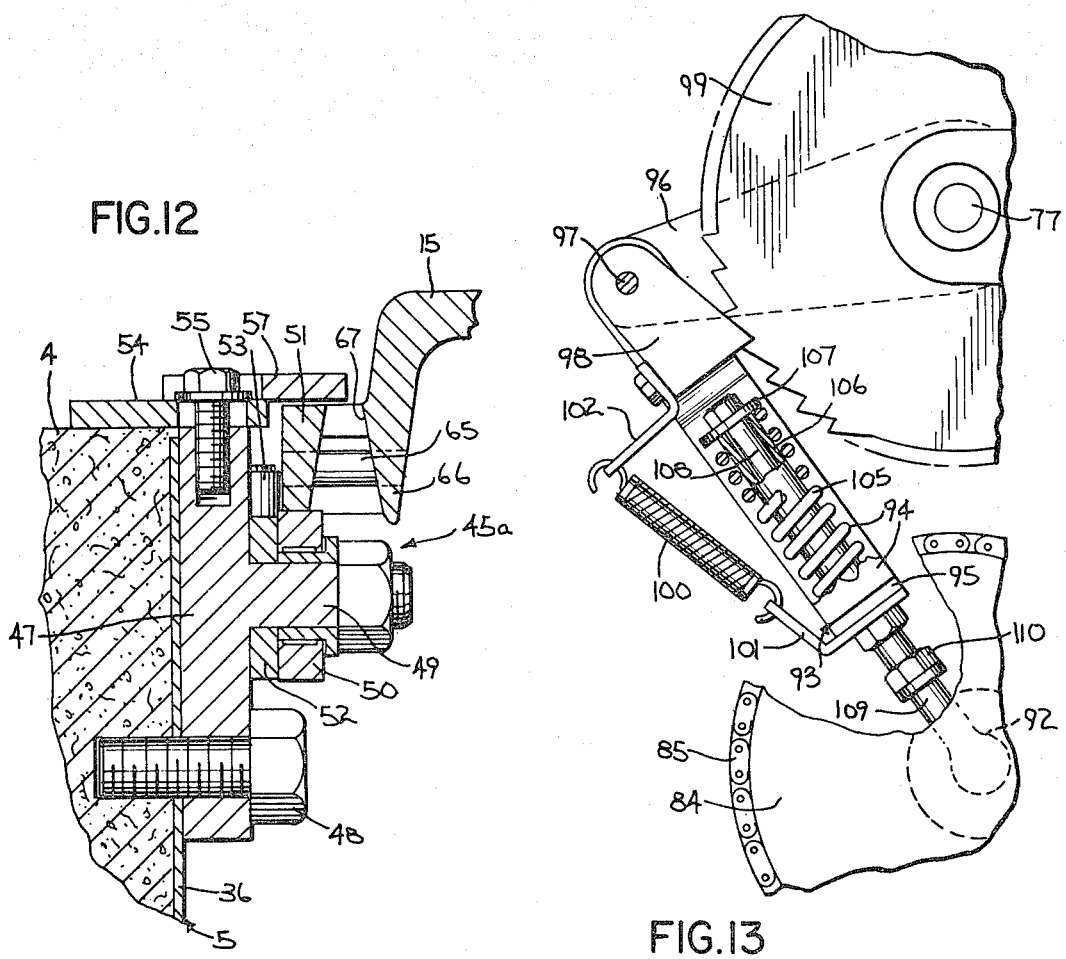
FIG.12
FIG.13

OVERLOAD MECHANISM FOR THE SYSTEM OF A BOTTOM SILO UNLOADER

This is a division of application Ser. No. 205,461, filed Nov. 10, 1980 now U.S. Pat. No. 4,386,695.

BACKGROUND OF THE INVENTION

Grain and other relatively free flowing materials are frequently stored in air tight silos or storage structures and are unloaded from the bottom of the silo through use of a bottom unloader. Typical bottom unloaders, as shown in U.S. Pat. Nos. 3,250,407, 3,084,818 and 3,851,774, include a sweep auger which is mounted for rotation about the center of the silo and acts to dislodge the stored material and convey it toward the center of the silo where it is delivered into the inner end of a radially extending trough formed in the silo foundation. A discharge auger or conveyor operates in the trough to convey the stored material to the exterior of the silo.

In the past, the sweep auger has been rotated about the center of the silo in an incremental or stepped manner. To provide this type of incremental movement, a drive unit, located on the exterior of the silo, is connected to a horizontal drive shaft through a ratchet and pawl connection which provides intermittent rotation for the drive shaft. As disclosed in U.S. Pat. No. 3,851,774, the drive shaft carries a worm which engages gear teeth formed on a turntable that carries the sweep auger. In this manner, rotation of the drive shaft will rotate the turntable and thereby rotate the sweep auger about the center of the silo.

In the bottom unloaders as used in the past, the sweep auger, in addition to being rotated about the center of the silo, has also been rotated about its axis through a drive mechanism which is taken off of the discharge conveyor. With this type of drive system, rotation of the discharge auger is transmitted to a vertical drive shaft, located at the inner end of the trough, and the upper end of the vertical shaft is connected to the sweep auger shaft to thereby rotate the sweep auger about its axis as it is rotated within the silo.

To aid in delivering the stored material to the discharge auger, the prior bottom unloaders have also incorporated a slinger which has been mounted on the vertical drive shaft at the inner end of the trough. Rotation of the slinger serves to deliver the stored material to the discharge auger where it can be conveyed to the exterior of the silo.

SUMMARY OF THE INVENTION

The invention is directed to an improved bottom unloader for a silo, or other storage structure, which contains a relatively free flowing material, such as grain. The bottom unloader includes a sweep auger which is carried by a turntable located at the center of the silo and is disposed to rotate about the silo and dislodge the stored material and deliver it to the inner end of a trough formed in the silo foundation. Mounted within the trough is a discharge auger which conveys the dislodged material to the exterior of the silo.

To rotate the sweep auger about the center of the silo, a drive unit, which is located on the exterior of the silo, is connected to a horizontal drive shaft, located within the trough, by a ratchet and pawl mechanism so that the drive shaft will rotate in an incremental manner. The inner end of the drive shaft carries a sprocket which is adapted to engage a series of horizontal drive pins mounted on the lower surface of the turntable. With this drive, rotation of the sprocket will rotate the turntable and correspondingly move the sweep auger around the silo.

To prevent clogging of the drive pins, the turntable is formed with a series of holes located between adjacent drive pins, and rotation of the sprocket will act to extrude any stored material located between the drive pins through the holes to thereby prevent clogging.

The incorporation of the sprocket drive permits the sweep arm to back up in the event the sweep auger engages densely packed areas of material, and this slight backup of the sweep auger will aid it in moving through the densely packed area on continued operation of the drive mechanism. The drive system of the invention provides distinct advantages over systems utilizing a worm gear which will prevent reverse rotation from being transmitted to the sweep auger.

The bottom unloader of the invention also includes an improved slinger construction for delivering the dislodged material to the discharge auger. The slinger is provided with a pair of arms which are curved rearwardly in the direction of rotation and terminate in forwardly extending tips. This configuration enables the material to be carried at a relatively constant velocity to the discharge auger. A speed reduction is incorporated in the system which serves to rotate the vertical drive shaft, which carries the slinger, at a reduced speed with respect to the discharge auger to provide optimum material deliver with minimum damage to the material and reduced energy consumption. This permits the use of front and rear material entry openings in the turntable above the slinger and eliminates the problems associated with quadrant location of the sweep auger in the silo and loss of delivery. A second gear system interconnects the upper end of the vertical shaft with the shaft of the sweep auger and provides a speed ratio for optimum operation of the sweep auger.

The unloader mechanism also includes a novel sweep auger construction in which the auger comprises a plurality of shaft sections, each having a different diameter, with the innermost shaft section having the largest diameter and the outer shaft section having the smallest diameter. A helical flight is carried by each shaft section and the radial depth or height of the flight progressively decreases on each shaft section in a direction toward the outer end of the sweep auger. The pitch of the outermost flight section decreases in a direction toward the outer end of the sweep auger, while the pitch of the remaining flight sections can be uniform throughout the length. The sweep auger construction provides a substantially uniformly increasing rate of delivery of material from the outer end of the sweep auger toward the inner end, as the auger rotates about its axis.

Other objects and advantages will appear in the course of the following description.

DESCRIPTION OF THE DRAWINGS

The drawings illustrate the best mode presently contemplated of carrying out the invention.

In the drawings:

FIG. 1 is a side elevation of the bottom unloading mechanism of the invention as incorporated in an airtight silo, with parts broken away in section;

FIG. 2 is a top plan view of the structure shown in Fig, 1;

FIG. 7 is a vertical section of the drive mechanism at the inner end of the trough;

FIG. 8 is a side elevation of the sweep auger;

FIG. 9 is a top plan view of the drive mechanism shown in FIG. 7 with parts broken away in section;

FIG. 10 is a horizontal section showing the worm gear drive connecting the inner end of the discharge auger and the vertical drive shaft;

FIG. 11 is a vertical section taken along line 11—11 of FIG. 7, showing the sprocket drive for rotating the turntable;

FIG. 12 is an enlarged vertical section showing the roller assembly support for the turntable; and FIG. 13 is an enlarged fragmentary side elevation showing the pawl and ratchet drive, with parts broken away.

DESCRIPTION OF THE PREFERRED EMBODIMENT

Figure 3:
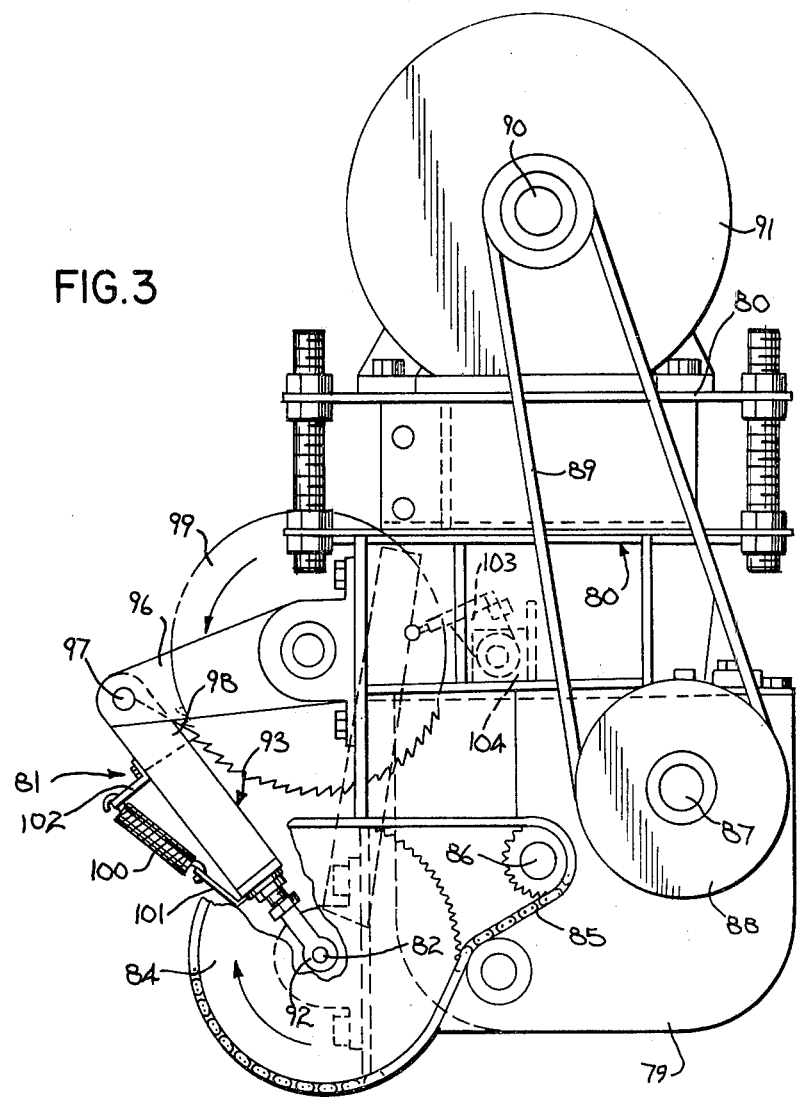
FIG. 3 is an end view of the drive unit.

The drawings illustrate a bottom unloading unit 1 which is disposed within a silo or storage structure 2 and is adapted to unload a relatively free-flowing material, such as grain, from the structure.

The unloading unit 1, in general, includes a sweep auger 3 which is adapted to rotate about the center of the silo 2 over the foundation 4 and dislodge the stored material and convey it to the center of the silo where it is delivered to the inner end of a radially extending trough 5 formed in the foundation 4. A discharge auger 6 operates within the trough 5 and acts to convey the stored material through the trough to the exterior of the silo.

The sweep auger 3 is composed of a series of shaft sections 7a–7d, each of which has a different diameter. As best illustrated in FIG. 8, the inner shaft section 7a has the largest diameter, while the outer section 7d has the smallest diameter. The shaft sections 7a–7c are tubular and the inner end of each section 7b–7d is secured within the outer end of the adjacent inner section.

The auger 3 also includes a helical flight, composed of flight sections 8a–8d, which are mounted on the respective shaft sections 7a–7d. As illustrated, the flight sections 8a–8c have a constant pitch, while the flight section 7d, associated with the outer shaft section 7d, has a variable pitch with the pitch decreasing in a direction toward the outer end of the sweep auger. However, it is contemplated that in some installations each flight section can have a variable pitch, decreasing toward the outer end of the sweep auger. In addition, the flight sections 8a–8d, each have a progressively varying height or depth with the radial depth of each flight section decreasing in a direction toward the outer end of the sweep auger.

The configuration of the sweep auger provides a substantially uniformly increasing flow or delivery of material from the outer end of the auger toward the inner end as the auger rotates about its axis and sweeps over the foundation. When dealing with a relatively free flowing stored material, it is important to provide an increasingly uniform rate of flow of the dislodged material to the discharge trough 5 in order to enable the mass of material to move down uniformly within the silo and prevent the formation of voids in the stored material along the silo wall. With a sealed silo, the pressure differential resulting from the formation of voids can cause buckling of the silo wall.

To rotate the sweep auger 3 about its axis, the inner shaft section 7a of the sweep auger is coupled to the end of a horizontal shaft 13 which projects outwardly of a central housing 14 that is located at the center of the silo and is mounted on a turntable 15. As best shown in FIG. 7, the shaft 13 is journalled for rotation within bearing assemblies 16 located in opposite sides of the housing, and the shaft carries a bevel gear 17 which engages bevel gear 18 secured to the upper end of a cup-shaped member 19. Member 19 is mounted for rotation within the lower portion of the housing by bearing assemblies 20, and a spacing ring 21 is secured to the lower end of the cup member. The joint between the spacing ring 21 and the housing 14 is sealed by a gasket 22.

The cup-shape member 19 is splined to the upper end of vertical shaft 23 while the lower end of shaft 23 is journalled within a gear box 24 by a pair of bearing assemblies 25. Mounted on the lower end of shaft 23 is a worm gear 26 which is engaged with a worm 27 carried by horizontal worm shaft 28. Shaft 28 projects outwardly of the gear box 24 (See FIG. 10) and is splined to the shaft 29 of the discharge auger 6 which rotates within a tube 30 located within the trough 5. As best shown in FIG. 9, the tube 30 is offset from the longitudinal center line of trough 5.

The outer end of tube 30 extends through an opening in panel 31 of the silo wall 32, and the stored material being conveyed outwardly by the discharge auger 6 through tube 30 is discharged from the tube to the exterior through a discharge door assembly 33 which is located at the outer end of tube 30.

The trough 5 which extends radially from the center of the silo to the exterior includes a bottom plate 34, a pair of parallel side plates 35, and a curved end plate 36, which is located at the inner end of the trough and connects the inner ends of side plates 35. The gear box 24 is mounted on a frame 37 which rests on the bottom plate 34 of the trough 5. The frame 37 is composed of a pair of side angles 38 which are connected at their ends by end angles 39. In addition, a pair of straps 40 connect the lower flanges of side angles 38 together. To secure the gear box 24 to the frame, bolts 41, welded to straps 40, extend through openings in the flanges 42 on the gear box.

The frame 37, which carries the gear box 24, is freely movable within the trough and its position can be properly adjusted by means of adjusting screws 43 which are located at opposite sides of the trough and are threaded within bosses 44 mounted on the end angles 39 and engage the respective side plates 35 of the trough. By adjustment of the screws 43, the lateral position of the frame 37 and gear box 24 can be adjusted.

As previously noted, the inner end of the sweep auger 3 is carried by the housing 14 which is mounted on the turntable 15. The turntable 15 is mounted for rotation with respect to the foundation 4 by a series of roller assemblies 45, which are mounted on the trough 5. As best shown in FIG. 9, a group of roller assemblies 45a are mounted on the curved end plate 36 of trough 5 adjacent the center of the silo, while a pair of roller assemblies 45b are mounted, respectively, on brackets 46 which are secured to the respective side plates 35 of the trough. The roller assemblies 45 are disposed in a generally circular configuration and support the turntable 15 in rotation.

Each roller assembly 45a includes a body section 47 which is secured to the trough 5 by anchor bolts 48 that are embedded in the foundation 4. Similarly, roller assemblies 45b include body sections 47 which are secured to brackets 46 by bolts 48.

A horizontal shaft 49 projects inwardly from each body section 47 and a roller 50 is mounted for rotation on the shaft and is adapted to ride against the lower edge of flange 51 on the turntable 15. A bracket 52 is mounted on each shaft 49 between the body portion and the roller 50, and rollers 53 are mounted for rotation on the outer ends of each bracket. The rollers 53 have vertical axes and are adapted to ride against the outer periphery of the flange 51 on the turntable. With this construction, the flange 51 on the turntable 15 is guided in rotation by the rollers 50, as well as the rollers 53.

A cover plate 54 is attached to the upper ends of the body sections 47 of the roller assemblies 45 by bolts 55, and the peripheral edge of the cover plate projects outwardly beyond the trough, so that the periphery of the cover plate overlays the concrete foundation 4, as shown in FIG. 12. Cover plate 54 is provided with a large central opening that receives the turntable 15. The turntable is provided with two kidney-shaped openings 56, one beneath the inner end of the sweep auger 3 and the other, diametrically opposite, and the stored material, dislodged and conveyed inwardly toward the center of the silo by the sweep auger 3, is delivered through the openings 56 into the central portion of the trough 5. In some installations, one of the openings 56 can be enclosed depending on the type of material being unloaded and the desired unloading capacity.

A retaining ring 57 is secured to the cover plate 54 and extends inwardly over the peripheral edge of the turntable 15, as best illustrated in FIG. 12.

To aid in delivering the dislodged material, which is discharged through the openings 56 to the inner end of the trough 5 to discharge auger 6, a slinger 58 is mounted on the shaft 23 and rotates with the shaft. The slinger has a central hub 59 which is splined to shaft 23 and is also connected to the spacer 21 through bolts 60.

Figure 6:
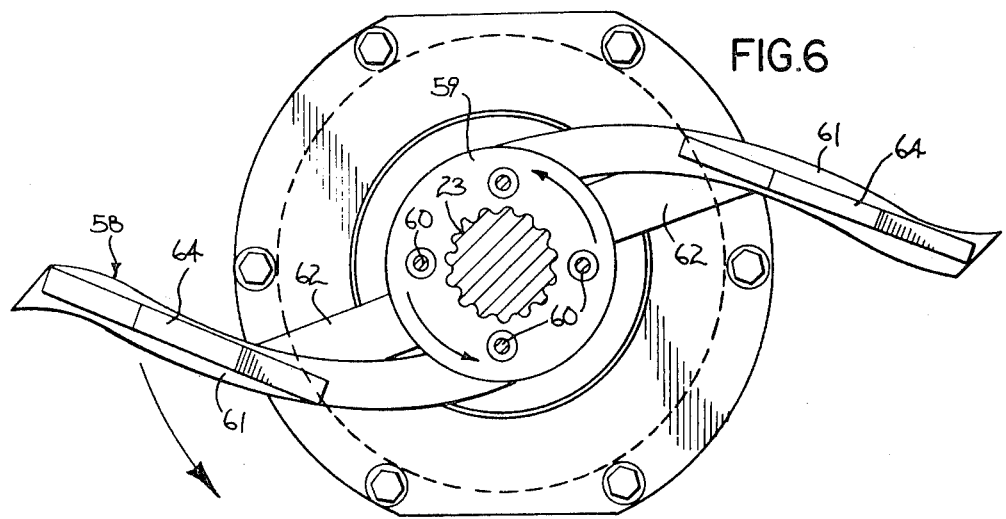
FIG. 6 is a horizontal section of the drive mechanism at the inner end of the trough and showing the slinger.

As best shown in FIG. 6, a pair of blades 61 which extend outwardly from the hub 59 and are swept back in a curved configuration with relation to the direction of rotation, as indicated by the arrow in FIG. 6, while the outer extremity of each blade is swept forward. Each blade 61 is supported by a brace 62. With this configuration, the dislodged material discharged into the central portion of the trough 5 will be carried ahead by the slinger 58 to the discharge auger 6. The reverse curvature of the outer extremities of the blades 61 will tend to slow the velocity of the particles being discharged from the slinger.

As shown in FIGS. 6 and 7, ribs 64 extend upwardly from each blade into the space between the slinger and the housing 14 and provide a greater surface area for the slinger.

The slinger 58 operates at a speed to provide optimum delivery of material to the discharge auger. As the slinger is driven from the discharge auger 6, the output speed of the auger is reduced through the worm gear reduction 26,27 so that the slinger 58 operates at a reduced RPM. As it is desired that the sweep auger 3 rotate about its axis at a faster rate of speed than the rotation speed of the slinger 58, the bevel gear mechanism 17,18 in the upper housing 14 serves to increase the speed of rotation so that the sweep arm will rotate at an increased speed to provide adequate material flow for the discharge auger 6 that is fed by the slinger 58. In practice, the discharge auger shaft may be rotated at a speed of approximately 70 RPM and this is reduced through the worm gear reduction 26,27 so that the slinger 58 will operate at about 10 RPM, and this speed is increased through the bevel gear drive 17,18 so that the sweep arm auger will rotate about its axis at about 20 RPM.

In addition to being rotated about its axis, the sweep auger 3 is driven in a rotary path about the axis of the silo in a stepped or incremental type of movement. To provide this rotation, a series of hardened drive pins 65 are mounted within aligned openings in the outer turntable flange 51 and an inner flange 66, as illustrated in FIG. 12. In addition, the turntable is provided with a plurality of openings 67 which are disposed in alignment with the spaces between the drive pins 65. The drive pins 65 are engaged by the teeth 68 of a drive sprocket 69, and as the sprocket 69 rotates, the turntable 15 and sweep auger 3 will be correspondingly rotated about the center of the silo.

Due to the fact that the trough 5 contains the dislodged stored material, the teeth 68 on the drive sprocket 69 will tend to drive the stored material into the spaces between the drive pins 65, and as the sprocket teeth 68 move into the spaces between the drive pins 65, the compacted grain, or other stored material, will be extruded upwardly through the openings 67. To permit the extruded material to be discharged through openings 67, the retaining ring 57 is provided with a notch or recess 70, as shown in FIG. 9, which is aligned with the drive sprocket 69. Thus, any stored material located within the spaces between the drive pins 65 will be automatically extruded upwardly by the sprocket teeth 68 through the openings 67 and notch 70 and be returned to the flow path of the material.

The drive sprocket 69 is secured to the end of a horizontal shaft 71 which is journalled for rotation within bearing assembly 72 that is mounted through brackets 73 to the undersurface of cover plate 54. As shown in FIG. 9, the bearing assembly 72 is mounted within an opening in a transverse wall 74 that extends between the side plates 35 of the trough 5 and is secured to the brackets 46. The discharge conveyor tube 30 is also secured within an opening in the transverse wall 74, while the inner end of discharge auger 6 projects inwardly beyond the wall 74 and the end of tube 30.

The portion of the trough 5 extending from cover plate 54 to the silo wall is enclosed by a group of plates 75 which are secured to the foundation 4 and overlie the trough.

Figure 5:
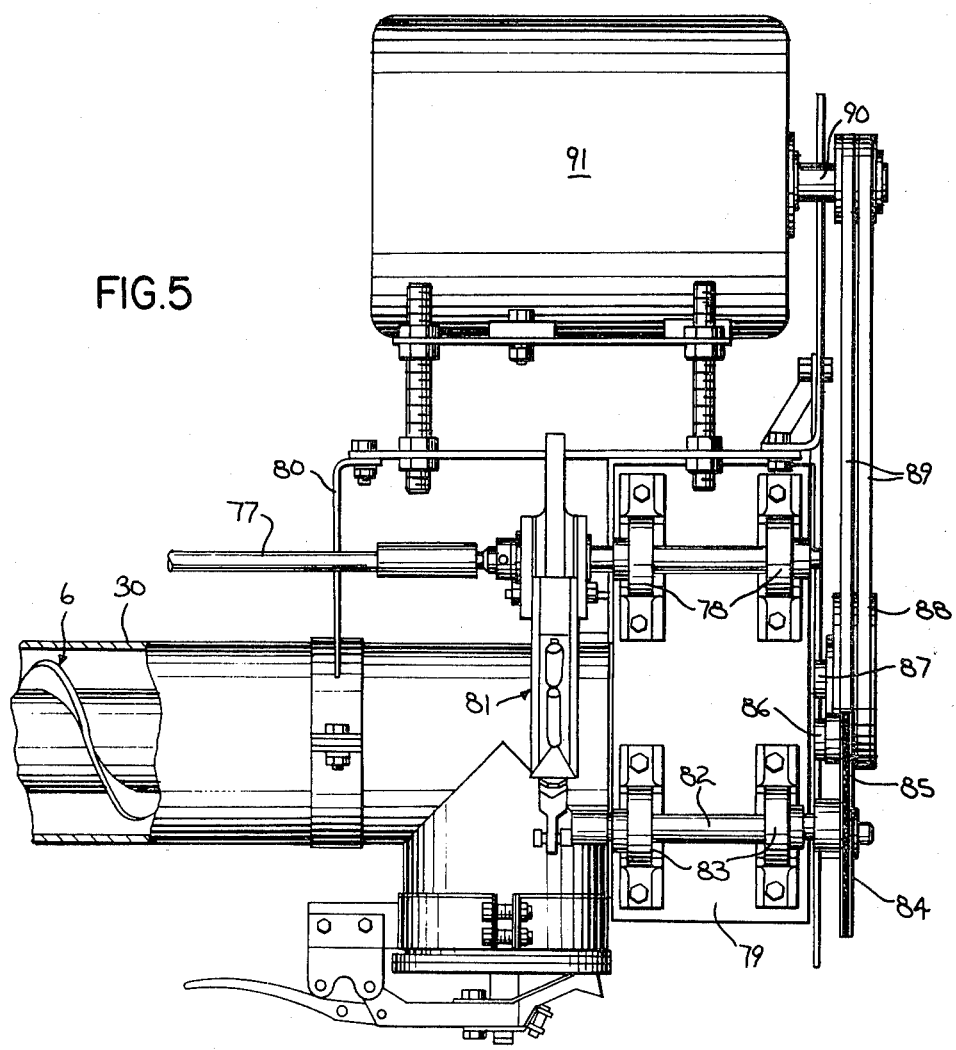
FIG. 5 is an enlarged side elevation of the drive unit.

The outer end of sprocket shaft 71 is connected through a gear box 76, located on the outside of the silo, to one end of a shaft 77, while the other end of shaft 77 is journalled within a pair of bearing assemblies 78 mounted on the outer surface of gear box 79 which is carried by frame 80 mounted on the end of the discharge conveyor tube 30. (See FIG. 5) The shaft 77 is connected through a ratchet and pawl mechanism, indicated generally by 81, to one end of a shaft 82 which is journaled within bearing assemblies 83 mounted on gear box 79. The opposite end of the shaft 82 carries a sprocket 84 which is connected by a chain 85 to a sprocket on one end of output shaft 86 of gear box 79.

Figure 4:
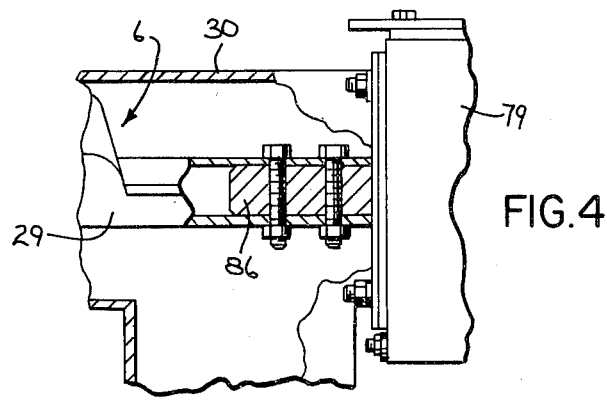
FIG. 4 is an enlarged fragmentary side elevation of the outer end of the discharge auger, with parts broken away in section, and showing the connection between the discharge auger shaft and the output shaft of the drive unit.

The opposite end of output shaft 86 is coupled to the shaft 29 of the discharge auger 6, as shown in FIG. 4.

The input shaft 87 of the gear box 79 carries a pulley 88 which is connected through belts 89 to a pulley on the drive shaft 90 of motor 91. With this drive arrangement, rotation of the motor drive shaft 90 operates through the gear box 79 to drive the output shaft 86 which is connected directly to the discharge auger shaft 29. In addition output shaft 86 is connected through the chain drive 85 to shaft 82 and the rotation of shaft 82 is converted to an intermittent or stepped drive by the ratchet and pawl mechanism 81, so that the sprocket shaft 71 will rotate in increments to drive the sweep auger 3 around the silo with a stepped or incremental movement.

As best illustrated in FIG. 13, the ratchet and pawl mechanism 81 includes an eccentric collar 92 which is mounted on the end of shaft 82. Collar 92 is attached to the end of a bracket 93 composed of a pair of spaced arms 94 connected by a base 95. The upper end of the bracket is connected by a pin 97 to a pair of links 96, while the opposite ends of the links 96 are mounted for pivotal movement on the shaft 77. Located between the links 96 is a pawl 98 that is pivoted on the pin 97 and is adapted to engage the teeth on a ratchet wheel 99 which is secured to the shaft 77. A spring 100 acts to bias the pawl 98 into engagement with the ratchet teeth and, as illustrated in FIG. 13, one end of the spring 100 is secured to a bracket 101 mounted on the bracket 93, while the other end of the spring is attached to an L-shaped arm connected to the rear edge of the pawl 98.

Rotation of the shaft 82 will act through the eccentric collar 92 to move the bracket 93 in a reciprocating stroke of travel to thereby cause the pawl 98 to successively engage the teeth on the ratchet 99 and move the drive shaft 77 in a stepped or incremental manner. As previously described, the drive sprocket 67 is connected to the inner end of shaft 77, so that the turntable 15 and the sweep auger 3 will be correspondingly rotated in increments.

As shown in FIG. 3, a holding pawl 103 is pivotally mounted to a bracket 104 on frame 80 and is biased into engagement with the teeth of the ratchet by a spring, not shown. The holding pawl 103 operates in a conventional manner to permit rotation of the ratchet in the direction of the arrow, but will prevent reverse rotation.

To provide an override in the event the sweep auger 3 engages hard packed materials and cannot be rotated, a spring 105 is located between the arms 94 of bracket 93, as shown in FIG. 13, and is disposed around a tubular sleeve 106. One end of the spring bears against the base 95, while the opposite end of the spring bears against a washer 107.

To retain the spring 105 in position, a threaded stud 108 extends through the sleeve 106 and the head of the stud bears against washer 107. A shaft 109, which carries the eccentric collar 92, is threaded to the end of the stud 108 and a lock nut 110 is engaged with the shaft.

If the sweep auger 3 encounters a densely packed area which prevents the auger from advancing, movement of the drive pawl 98 will not be able to rotate the ratchet 99 to a position where the holding pawl 103 will engage the next successive tooth. In this situation, continued movement of the bracket 93 will compress the spring 105 to permit the bracket 93 to move in the reciprocating path of travel by operation of the eccentric collar 92. Thus, the spring 105 provides an over-riding safety mechanism which will prevent damage to the drive mechanism in the event the sweep auger engages densely compacted material.

The use of the drive sprocket 69 in combination with the ratchet and pawl mechanism 81, permits the sweep auger to oscillate slightly and back away from the hard packed area due to the action of the spring 105. More specifically, when the sweep auger 3 engages a hard, compacted area which prevents advancement of the sweep auger, the drive pawl 98 may rotate the ratchet 99 a slight amount, but not enough for the holding pawl 103 to make engagement with the next succeeding tooth. In this situation, continued movement of the eccentric collar will compress the spring 105, and the drive pawl will return to its original position, and the ratchet wheel 99 will move in reverse due to the torque in the system. The reverse movement of the ratchet wheel 99 will cause a slight rear movement of the sweep auger away from the hard packed area of material, and this slight back-up of the sweep auger will aid it in moving through the hard packed area on continued operation of the drive mechanism. The use of the sprocket 65 permits this backup of the sweep arm as opposed to drive systems utilizing a worm gear which will prevent the reverse rotation from being transmitted to the sweep auger.

As shown in FIG. 2, trough plates 111 are secured to the foundation 4 and cover the outer portion of trough 5, extending between cover plate 54 and silo panel 31.

OPERATION

Operation of the motor 91 will act through the pulley drive 88 and gear reduction unit 79 to drive the output shaft 86, which is connected to the shaft of the discharge auger 6. Rotation of the discharge auger operates through the worm gear reduction 26,27 and bevel gear system 17,18 to rotate the sweep auger 3 about its axis. As previously noted, the worm gear reduction 26,27 serves to provide a speed reduction so that the slinger 58 will operate at a substantially reduced speed with respect to the rotation of the discharge auger 6. The speed is then increased through the bevel gear drive 17,18 so that the sweep auger 3 will operate at a slightly increased speed with respect to the slinger 58.

Rotation of the sweep auger 3 about its axis will move the stored material inwardly toward the center of the silo, and the inner end of the sweep auger 3 is provided with a kicker 112 (See FIG. 2) which aids in breaking up lumps and moving the material through the discharge opening 56 in the turntable which is located beneath the sweep auger and into the central portion of the trough. As the material is free flowing, it will also flow by gravity through the other of the discharge openings 56 into the trough. The slinger 58 serves to move the material in the central portion of the trough toward the discharge auger 6 where it is conveyed through the tube 30 for discharge through the door assembly 33 to the exterior.

Along with the rotation of the sweep auger about its axis, the auger is also moved incrementally about the axis of the silo. In this regard the output shaft 86 is connected through the chain drive 85 and ratchet pawl mechanism 81 to the shaft 71, which carries the drive sprocket 69 that engages the drive pin 65 on the turntable. With this construction, rotation of the drive sprocket 69 acts to move the turntable 15 in steps or increments about the center of the silo.

Various modes of carrying out the invention are contemplated as being within the scope of the following claims particularly pointing out and distinctly claiming the subject matter which is regarded as the invention.

I claim:

1. In a bottom silo unloader mechanism, a sweep auger disposed to rotate about the center of the silo and having a drive unit for rotating said sweep auger, an overload mechanism connected in the drive unit and including a drive member, a drive pawl operably connected to the drive member and disposed to move in a reciprocating path, a rotatable ratchet having a series of teeth to be engaged by the drive pawl, said drive pawl acting to engage said teeth and incrementally rotate said ratchet in one direction, a holding pawl engaged with said teeth to prevent rotation of the ratchet in the opposite direction, a shaft operably connected to the ratchet and disposed to rotate with the ratchet, a sprocket connected to the inner end of the shaft and having a plurality of teeth, a turntable mounted for rotation with respect to the silo and located at the center of the silo, a plurality of spaced driving elements disposed on said turntable and engageable with the teeth of said sprocket for rotating said turntable in accordance with rotation of said sprocket, said sweep auger being mounted on said turntable and disposed to rotate therewith about the axis of said silo, and resilient means interconnecting the drive pawl and the drive member, whereby interruption of rotation of the sweep auger due to engagement of the sweep auger with a densely packed area of stored material will cause compression of said resilient means and enable said drive pawl to move in said reciprocating path without corresponding rotation of said ratchet, said overload mechanism having the capability of permitting the sweep auger to oscillate and back away in a reverse direction from said densely packed area.

2. The mechanism of claim 1, wherein said drive member is a rotating shaft and an eccentric connects said shaft and the drive pawl.

3. The mechanism of claim 1, wherein said resilient means comprises a compression spring.

4. The mechanism of claim 1, wherein said driving elements comprise a plurality of drive pins to be engaged by said sprocket, said drive pins having horizontal axes and being spaced circumferentially of said turntable.

* * * * *